(12) United States Patent
DiFoggio

(10) Patent No.: US 7,707,883 B2
(45) Date of Patent: May 4, 2010

(54) APPARATUS AND METHOD FOR IMPROVED LIGHT SOURCE AND LIGHT DETECTOR FOR GRAVIMETER

(75) Inventor: Rocco DiFoggio, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 11/935,527

(22) Filed: Nov. 6, 2007

(65) Prior Publication Data

US 2009/0114013 A1 May 7, 2009

(51) Int. Cl.
*G01V 7/04* (2006.01)
(52) U.S. Cl. .................................. 73/382 R; 73/152.59
(58) Field of Classification Search ............... 73/382 R, 73/382 G, 152.59; 356/482, 499
See application file for complete search history.

(56) References Cited

U.S. PATENT DOCUMENTS

| | | | |
|---|---|---|---|
| 3,688,584 A * | 9/1972 | Stone et al. ............... | 73/382 R |
| 5,694,503 A | 12/1997 | Fleming et al. | |
| 5,755,850 A | 5/1998 | Martin et al. | |
| 5,829,445 A | 11/1998 | Martin et al. | |
| 5,868,734 A | 2/1999 | Soufiane et al. | |
| 5,892,151 A * | 4/1999 | Niebauer et al. .......... | 73/382 R |
| 6,079,267 A | 6/2000 | Hull | |
| 6,233,386 B1 | 5/2001 | Pack et al. | |
| 6,668,111 B2 | 12/2003 | Tapalian et al. | |
| 6,937,633 B2 | 8/2005 | Chua et al. | |
| 7,065,112 B2 | 6/2006 | Ghosh et al. | |
| 7,222,534 B2 * | 5/2007 | Maas et al. ............... | 73/514.26 |
| 7,469,585 B2 * | 12/2008 | Meyer ....................... | 73/382 R |
| 2004/0108530 A1 | 6/2004 | Sandvik et al. | |
| 2004/0129083 A1 * | 7/2004 | Fernald et al. ............ | 73/705 |
| 2006/0070432 A1 * | 4/2006 | Ander ....................... | 73/152.05 |
| 2006/0164648 A1 | 7/2006 | Howard | |
| 2007/0034793 A1 | 2/2007 | Estes et al. | |
| 2008/0110258 A1 * | 5/2008 | Meyer ....................... | 73/382 R |

OTHER PUBLICATIONS

Laser diode, [online]; [retrieved on Jul. 9, 2007]; retrieved from the Internet, http://en.wikipedia.org/wiki/Diode_laser.

Fox, et al. "Stable Optical Cavities for Wavelength References". National Institute of Standards and Technology. NIST Technical Note 1533. May 2004. pp. 1-24.

Loh, et al. "Sub-10 cm3 Interferometric Accelerometer With Nano-g Resolution". Journal of Microelectromechanical Systems, vol. 11. No. 3, Jun. 2002. pp. 182-187.

Sandia creates motion detector 1,000 times more sensitive than any known, [online]; retrieved from the internet http://www.sandia.gov/news/resources/release/2004/micro-nano/nanomeausre.html.

(Continued)

*Primary Examiner*—John Fitzgerald
(74) *Attorney, Agent, or Firm*—Cantor Colburn LLP

(57) ABSTRACT

An instrument for measuring gravitational acceleration from within a borehole, the instrument including: a light source having a semiconductor that comprises a bandgap greater than about two electron volts (eV); and a gravimeter for receiving light from the light source and providing output light with a characteristic related to the gravitational acceleration, the gravimeter implemented at least one of a nano electro-mechanical system (NEMS) and a micro electro-mechanical system (MEMS); wherein the light source and the gravimeter are disposed in a housing adapted for insertion into the borehole.

18 Claims, 6 Drawing Sheets

OTHER PUBLICATIONS

Sekaric, et al. "Nanomechanical resonant structures in silicon nitride: fabrication, operation and dissipation issues". Sensors and Actuators A 101 (2002) 215-219.

Keeler, et al. "Experimental demonstration of a laterally deformable optical nanoelectromechanical system grating transducer". Optics Letters. vol. 29. No. 11. Jun. 1, 2004. p. 118-1184.

Carr, et al. "Laterally deformable nanomechanical zeroth-order gratings: anomalous diffraction studied by rigorous coupled-wave analysis". Optics Letters. vol. 28. No. 18. Sep. 15, 2003. pp. 1636-1638.

Carr, et al. "Measurement of nanomechanical resonant structures in single-crystal silicon". J. Vac. Sci. Technol. B 16 (6), Nov.Dec. 1998. pp. 3821-3824.

Carr, Dustin, NEMS tunes the 'most sensitive' accelerometer, [online]; retrieved from the Internet http://www.techcommjournal.org/archive.php?articleID=141. Oct. 11, 2004.

Don't Move a Nanometer, [on-line]; retrieved from the Internet http://www.memagazine.org/backissues/jan05/departments/input_output/input_out.html. Jan. 2005.

International Search Report for International Application PCT/US 08/82491. Mailed Jan. 4, 2010.

Written Opinion of the International Searching Authority for International Application PCT/US 08/82491. Mailed Jan. 4, 2010.

* cited by examiner

TOP VIEW

SIDE VIEW

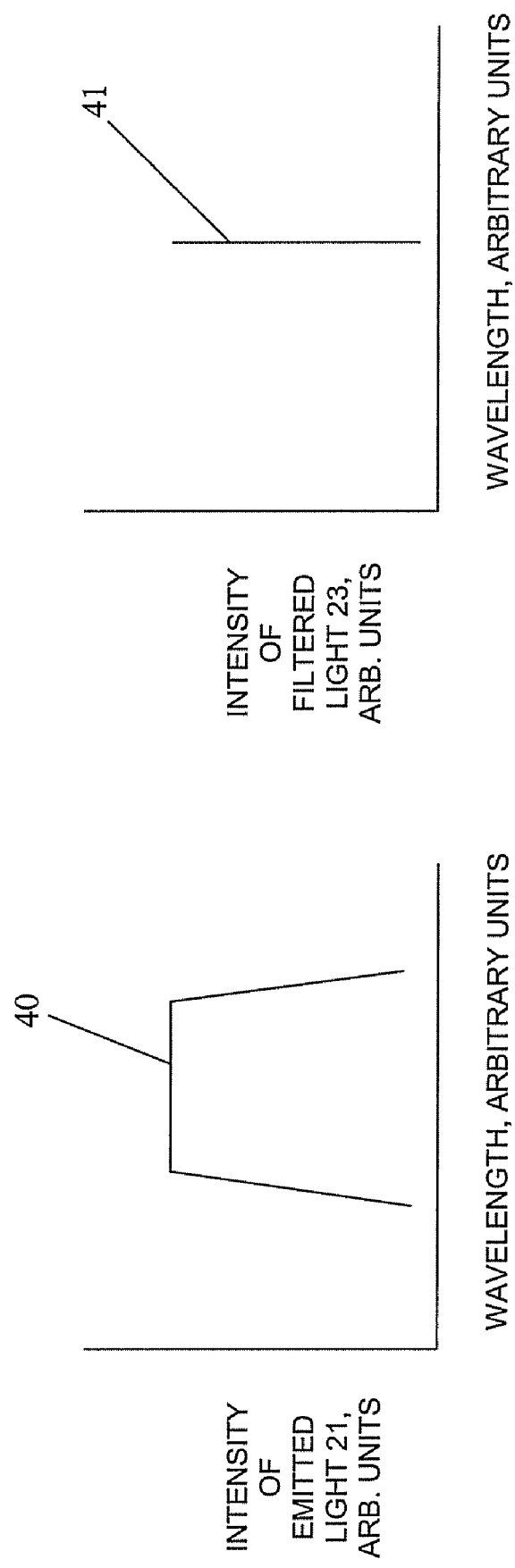

APPARATUS AND METHOD FOR IMPROVED LIGHT SOURCE AND LIGHT DETECTOR FOR GRAVIMETER

BACKGROUND OF THE INVENTION

1. Field of the Invention

The invention disclosed herein relates to well logging tools and, in particular, to an improved light source and light detector for well logging tools.

2. Description of the Related Art

In exploration for hydrocarbons, it is important to male accurate measurements of properties of geologic formations. In particular, it is important to determine the various properties with a high degree of accuracy so that drilling resources are used efficiently.

Generally, oil and gas are accessed by drilling a borehole into the subsurface of the earth. The borehole also provides access for talking measurements of the geologic formations.

Well logging is a technique used to take measurements of the geologic formations from the boreholes. In one embodiment, a "logging tool" is lowered on the end of a wireline into the borehole. The logging tool sends data via the wireline to the surface for recording. Output from the logging tool comes in various forms and may be referred to as a "log." Many types of measurements are made to obtain information about the geologic formations. One type of measurement involves determining gravitational acceleration or gravity.

Measurements of gravity can be used to determine information related to the mass of a surrounding formation. For example, measurements of gravity can be used to measure depletion of oil in the surrounding formation as water replaces the oil. When water replaces oil in the formation, the mass of the formation and, therefore, a gravitational force exerted by the formation will increase because water is denser than oil.

Measurements of gravity can also be used to determine true vertical depth in the borehole. The true vertical depth is important to know because borehole depth is a common factor among various logs. The various logs may be viewed side-by-side to form a composite picture of the geologic formations. Even small errors in determining the borehole depth can corrupt logging data. Horizontal deviations of the borehole, which can corrupt the logging data, can be accounted for by determining the true vertical depth using gravitational measurements.

A logging tool used for measuring gravity may employ a gravimeter that relates changes in gravitational acceleration to changes in light. This type of gravimeter requires a light source and a light detector. In order to obtain accurate measurements, it is important for the light source and the light detector to operate in a stable manner in the environment of the borehole.

In general, temperature in the borehole increases with increasing depth. In some instances, the temperature can be as high as 260° C. Additionally, the light source and the light detector may be subject to shocks of acceleration while traversing the borehole. To survive the rigors of the borehole environment, the light source and the light detector can be built using solid state technology. For example, the light source may include a laser diode and the light detector may include a photodiode.

Accurate measurements usually require that the wavelength of light emitted from the laser diode not shift more than ten ppm. In addition, the intensity of the light emitted from the laser diode should remain constant. With respect to the photodiode, the output should also remain stable for a stable input of light. With increasing temperature, the intensity of the light emitted from a laser diode decreases and the wavelength of the light increases to longer wavelengths. At high enough temperatures, such as temperatures within the borehole, most conventional laser diodes stop working. Providing stable laser light wavelength generally requires that the temperature of the conventional laser diode be maintained to within 0.001° C. Maintaining temperatures with this accuracy can be difficult in the borehole environment.

Therefore, what are needed are a light source and a light detector that can operate throughout a range of high temperatures and require less-stringent temperature control.

BRIEF SUMMARY OF THE INVENTION

Disclosed is an embodiment of an instrument for measuring gravitational acceleration from within a borehole, the instrument including: a light source having a semiconductor that comprises a bandgap greater than about two electron volts (eV); and a gravimeter for receiving light from the light source and providing output light with a characteristic related to the gravitational acceleration, the gravimeter implemented by at least one of a nano electromechanical system (NEMS) and a micro electromechanical system (MEMS); wherein the light source and the gravimeter are disposed in a housing adapted for insertion into the borehole.

Also disclosed is one example of a method for measuring gravitational acceleration from within a borehole, the method including: placing a light source and a gravimeter in the borehole, the light source having a semiconductor that has a bandgap greater than about two electron volts (eV), the gravimeter implemented by at least one of a nano electromechanical system (NEMS) and a micro electromechanical system (MEMS); and illuminating the gravimeter with light emitted from the light source wherein the light is used to perform the measuring.

Further disclosed is an embodiment of a system for measuring gravitational acceleration from within a borehole, the system including: a logging tool; a light source having a semiconductor that has a bandgap greater than about two electron volts (eV); a gravimeter for diffracting light emitted from the light source, the diffracted light having an intensity related to the gravitational acceleration, the gravimeter implemented by at least one of a nano electromechanical system (NEMS) and a micro electromechanical system (MEMS); a light detector having a semiconductor that has a bandgap greater than about two eV, the light detector for measuring the intensity; and a data collector for providing measurement data to a user.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings, wherein like elements are numbered alike, in which:

FIGS. 4A and 4B, collectively referred to as FIG. 4, present graphs depicting an effect of the optical filter;

DETAILED DESCRIPTION OF THE INVENTION

Figure 1:
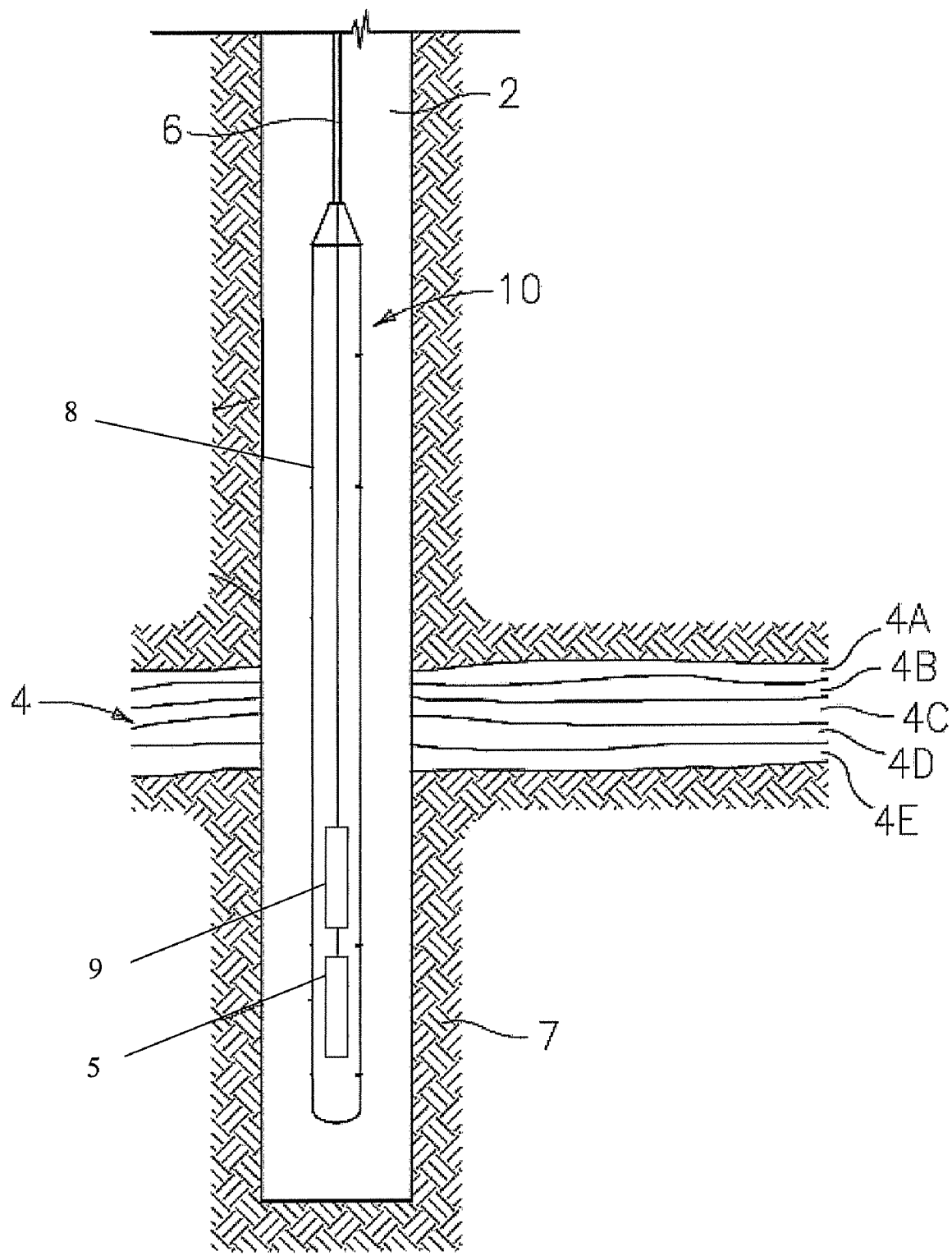
FIG. 1 illustrates an exemplary embodiment of a logging tool in a borehole penetrating the earth.

The teachings provide techniques for measuring gravitational acceleration from within a borehole. In particular, the techniques provide for stable measurements of gravitational acceleration with varying temperatures within the borehole.

Gravitational acceleration is measured using a gravitational accelerometer, also referred to as a "gravimeter." The gravimeter receives light and alters the light in accordance with an amount of gravitational acceleration sensed by the gravimeter.

The techniques include a light source for emitting light to the gravimeter. The light has a wavelength and an intensity that are stable over a range of temperatures to which the light source is exposed. In addition, the techniques provide a light detector that generates an output that is stable over a range of temperatures to which the light detector is exposed. Stability of the light source and stability of the light detector are provided by using semiconductors that include wide bandgap materials in conjunction with achievable temperature control. A narrower range of wavelengths, achieved using the wide band gap materials, results in more accurate measurements of gravitational acceleration than would occur if wavelength was allowed to drift by more than 10 ppm.

For convenience, certain definitions are provided. The term "gravimeter" relates to a sensor for measuring gravitational acceleration. The sensor receives light from a light source and relates a change in gravitational acceleration to a change in characteristics of light emitted from the sensor. Absolute gravitational acceleration can be measured with the gravimeter by relating the change in gravitational acceleration to a reference calibration point. The term "stable" relates to an output or parameter of a device that does not vary significantly with respect to an application. The term "light source" relates to a device that emits light for use in a sensor. In accordance with the teachings herein, the light source is maintained stable in a downhole environment. The term "light detector" relates to a device that generates an output (referred to as "photocurrent") in relation to the power of light (referred to as "incident light power") entering the device. The term "responsivity" refers to the ratio of generated photocurrent to the incident light power. In accordance with the teachings herein, the responsivity of a light detector made with wide bandgap materials is stable over a range of temperatures of interest to a user. The range of temperatures includes those temperatures that may be encountered by the logging tool in the borehole.

The term "bandgap" relates to an energy difference between the top of a valence band and the bottom of a conduction band in a semiconductor. Electrons in the conduction band are generally free to move to create an electrical current. Generally, only electrons, which have enough thermal energy to be excited across the bandgap, are available for conduction.

The term "housing" relates to a structure of a logging tool. The housing may used to at least one of contain and support a device used with the logging tool. The device may be at least one of the light source, the optical filter, and the light detector.

Referring to FIG. 1, one embodiment of a well logging tool 10 is shown disposed in a borehole 2. The logging tool 10 includes a housing 8 adapted for use in the borehole 2. The borehole 2 is drilled through earth 7 and penetrates formations 4, which include various formation layers 4A-4E. The logging tool 10 is generally lowered into and withdrawn from the borehole 2 by use of an armored electrical cable 6 or similar conveyance as is known in the art. In the embodiment of FIG. 1, an instrument 5 for measuring gravitational acceleration is disposed within the housing 8. Also depicted in FIG. 1 is an electronic unit 9, which receives and processes output data from the instrument 5.

In some embodiments, the borehole 2 includes materials such as would be found in oil exploration, including a mixture of liquids such as water, drilling fluid, mud, oil and formation fluids that are indigenous to the various formations. One skilled in the art will recognize that the various features as may be encountered in a subsurface environment may be referred to as "formations." Accordingly, it should be considered that while the term "formation" generally refers to geologic formations of interest, that the term "formations," as used herein, may, in some instances, include any geologic points of interest (such as a survey area).

For the purposes of this discussion, it is assumed that the borehole 2 is vertical and that the formations 4 are horizontal. The teachings herein, however, can be applied equally well in deviated or horizontal wells or with the formation layers 4A-4E at any arbitrary angle. The teachings are equally suited for use in logging while drilling (LWD) applications, measurement while drilling (MWD) and in open-borehole and cased-borehole wireline applications. In LWD/MWD applications, the logging tool 10 may be disposed in a drilling collar. When used in LWD/MWD applications, drilling may be halted temporarily to prevent vibrations while the logging tool 10 is used to perform a measurement.

Figure 2:
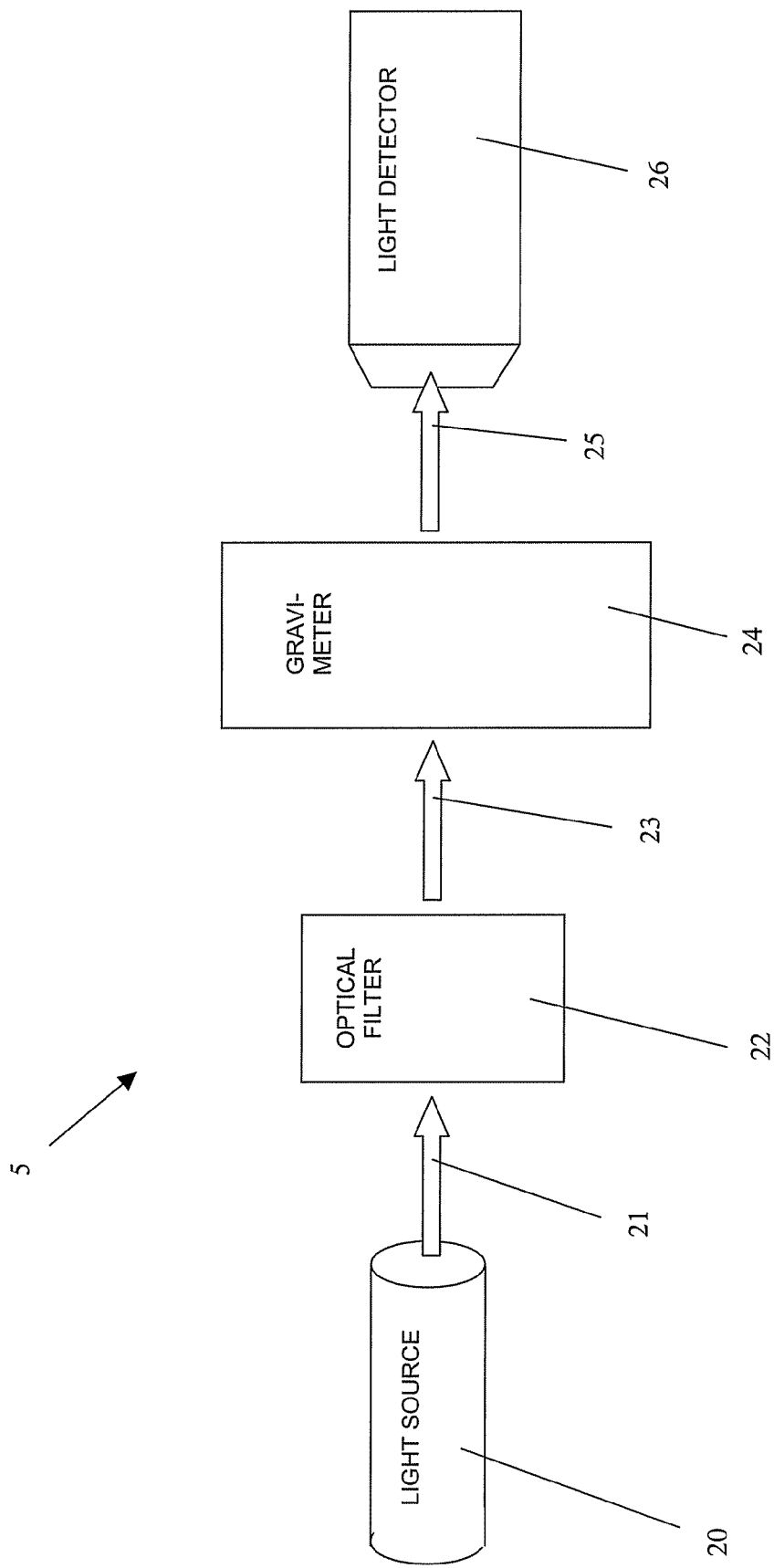
FIG. 2 illustrates aspects of an exemplary embodiment of a light source, an optical filter and a light detector.

FIG. 2 illustrates aspects of an exemplary embodiment of the instrument 5 that includes a light source 20, an optical filter 22, a gravimeter 24 and a light detector 26. Referring to FIG. 2, the light source 20 provides emitted light 21 to the optical filter 22. The optical filter 22 filters the emitted light 21 and provides filtered light 23 to the gravimeter 24. Generally, the filtered light 23 has a narrower range of wavelengths (and corresponding frequencies) than the emitted light 21. The gravimeter 24 receives the filtered light 23 and provides output light 25 to the light detector 26. The light detector 26 is used to measure at least one of intensity, frequency, and angle of the output light 25.

The gravimeter 24 may be built using solid state fabrication techniques to survive the environment of the borehole 2. Solid state fabrication also results in the gravimeter 24 having dimensions small enough to fit within the housing 8. In one embodiment, the gravimeter 24 is implemented by at least one of a Nano Electromechanical System (NEMS) and a Micro Electromechanical System (MEMS) as is known to those skilled in the art of NEMS and MEMS. In this embodiment, a proof mass is used to measure gravitational force. The proof mass is coupled to a diffraction grid such that at least one dimension of the diffraction grid changes with displacement of the proof mass. The diffraction grid is used along with the light source 20 and the light detector 26 to act as an interferometric displacement sensor. The filtered light 23 may be diffracted by the diffraction grid to provide the output light 25. Characteristics of the output light 25 can be measured by the light detector 26 and correlated to the displacement of the proof mass to determine the gravitational force. By knowing the mass of the proof mass and the gravitational force, the gravitational acceleration can be determined. The filtered light 23 with stable characteristics and a narrow range of wavelengths can provide for improved accuracy in gravitational measurements. Similarly, the light detector 26 with stable responsivity can also provide for improved accuracy in the gravitational measurements.

Figure 3A:
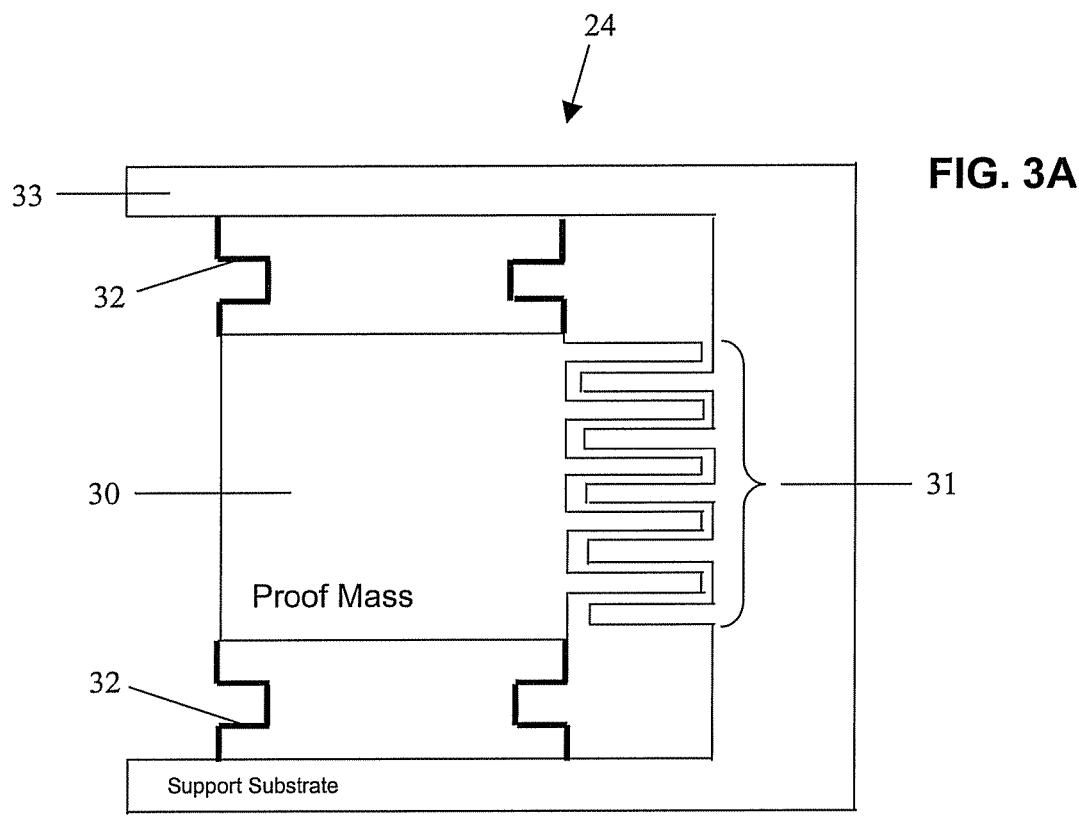
FIGS. 3A and 3B, collectively referred to as FIG. 3, illustrate an exemplary embodiment of a gravimeter.

FIG. 3 illustrates an exemplary embodiment of the gravimeter 24 that is implemented by at least one of a NEMS and a MEMS. A top view of the gravimeter 24 is depicted in FIG. 3A. Referring to FIG. 3A, the gravimeter 24 includes a proof mass 30 coupled to a diffraction grid 31. The proof mass 30 is suspended by springs 32 coupled to a support substrate 33. The springs 32 provide a counter-force to the force of gravity while allowing displacement of the proof mass 30 due to the force of gravity. In the embodiment depicted in FIG. 3A, the proof mass 30, the diffraction grid 31, and the springs 32 are implemented by at least one of the NEMS and the MEMS.

Figure 3B:
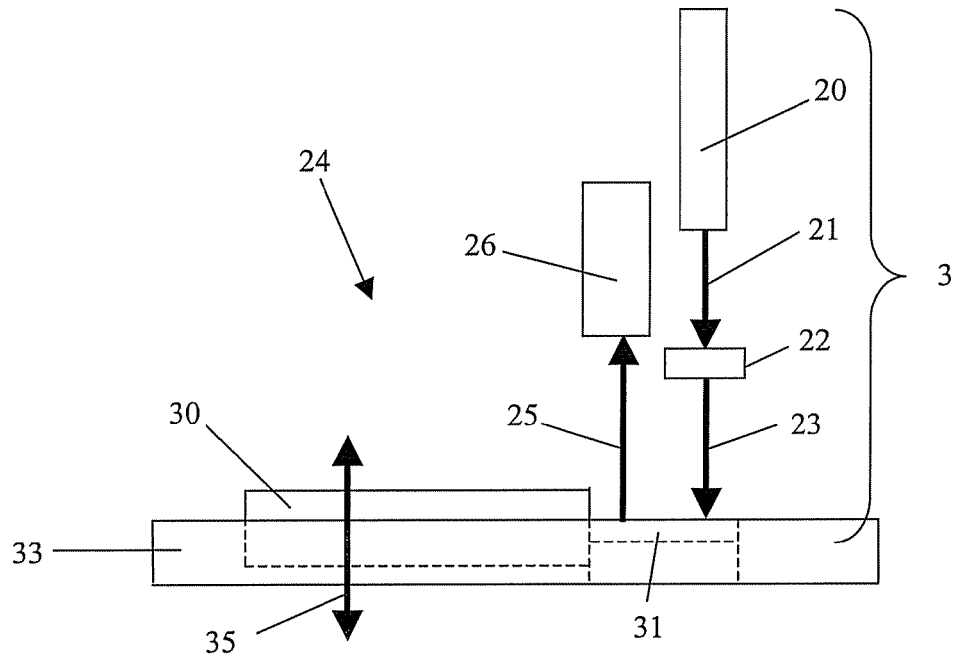

FIG. 3B illustrates a side view of the gravimeter 24. FIG. 3B depicts the gravimeter 24 with the light source 20, the optical filter 22, and the light detector 26. The diffraction grid 31, the light source 20, the optical filter 22, and the light detector 26 form an interferometric displacement sensor 34. Referring to FIG. 3B, the springs 32 allow movement of the proof mass 30 in substantially vertical direction 35. As the proof mass 30 moves, at least one dimension defining the diffraction grid 31 changes. In turn, intensity of the output light 25 is related to the at least one dimension. Thus, by measuring the intensity, displacement of the proof mass 30 can be determined. Further, the displacement can be correlated to an amount of gravitational force or gravitational acceleration imposed on the proof mass 30.

Wide band gap materials are used to make the light source 20 and the light detector 26. The wide bandgap materials provide stability for the light source 20 and the light detector 26 throughout a range of temperatures. Thermally generated electrons and holes can increase noise and change the wavelength (and corresponding frequency) of the emitted light 21. Similarly, the thermally generated electrons and holes can increase noise and reduce response of the light detector 26. By using the wide bandgap materials, the number of electrons and holes that are thermally excited to the conduction band is significantly reduced. Reducing the number of thermally excited electrons and holes in the conduction band results in the emitted light 21 having a stable wavelength and the light detector 22 having a stable responsivity. In addition, a reduction of thermally excited electrons and holes in the conduction band results in decreased noise in the light source 20 and the light detector 26.

The color of a light ray or photon corresponds to the wavelength and the associated energy of the photon. For example, blue light has a wavelength of 450 nanometers (nm) and a photon energy of about 2.76 electron volts (eV). The wide bandgap materials are associated with light towards the blue end of the light spectrum. Generally, semiconductors having wide bandgaps emit or respond to photons that have an energy corresponding to the energy of the bandgap. Thus, the light source 20 and the light detector 26 that are associated with light towards the blue end of the light spectrum provide for improved thermal behavior.

Many types of the wide bandgap materials may be used to build the light source 20 and the light detector 26. Examples of the wide bandgap materials include Gallium Phosphide (GaP), Gallium Nitride (GaN), and Silicon Carbide (SiC). With the exception of GaP (550 nm wavelength), these wide bandgap materials emit or respond to light in the ultraviolet range (100 nm-400 nm).

Recently developed wide bandgap (e.g. 405 nm) laser diodes can operate at higher temperatures than conventional laser diodes. The wide bandgap laser diodes have less wavelength shift with temperature (0.05 nm/° K) than the conventional laser diodes. A wavelength shift of 0.05 nm/° K corresponds to wavelength stability of 123 ppm/° C. Therefore, the wide band gap laser diodes require temperature maintenance to within about 0.081° C. to achieve 10 ppm wavelength stability, which can be achieved downhole. Intensity of the light emitted from the wide band gap laser diodes can be maintained by adjusting the current through the wide band gap laser diodes. An exemplary embodiment of a wide band gap laser diode for use as the light source 20 is a blue violet laser diode (405 nm) model number DL-3146-151 manufactured by SANYO Electric Company, LTD of Tottori, Japan.

The optical filter 22 filters the emitted light 21 to provide the filtered light 23 with a narrow range of wavelengths. FIG. 4 presents graphs depicting the effect of the optical filter 22 on the emitted light 21. FIG. 4A illustrates an exemplary graph 40 of intensity versus wavelength for the emitted light 21. FIG. 4B illustrates an exemplary graph 41 of intensity versus wavelength for the filtered light 23.

Figure 5:
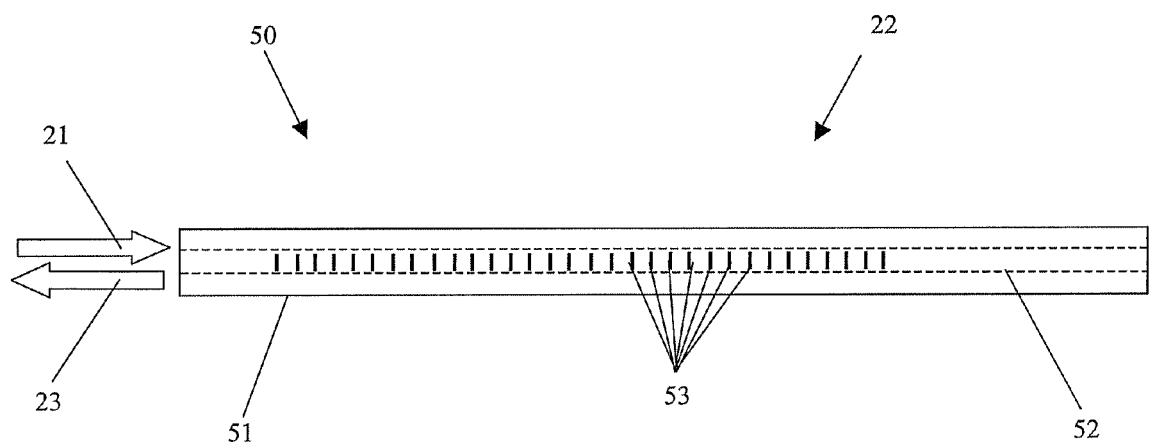
FIG. 5 illustrates an exemplary embodiment of a fiber Bragg grating.

One embodiment of the optical filter 22 is a fiber Bragg grating as shown in FIG. 5. The fiber Bragg grating forms an optical waveguide with at least one of periodic and aperiodic perturbations of the effective refractive index of a core of the waveguide. Referring to FIG. 5, a fiber Bragg grating 50 includes a cladding 51 and a core 52. Light is transmitted in the core 52 and reflected from the cladding 51. The core 52 includes at least one of periodic and aperiodic perturbations 53 (or grating 53) of the effective refractive index of the core 52 as depicted in FIG. 5. The effect of the grating 53 is that the fiber Bragg grating 50 can reflect a narrow range of wavelengths of light incident on the grating 53, while passing all other wavelengths of the incident light. The result is that the filtered light 23 depicted in FIG. 5 has a narrower range of wavelengths than the emitted light 21 incident on the grating 53.

Another embodiment of the optical filter 22 is a Fabry-Perot cavity. For optical channel separation, telecommunications Fabry-Perot cavity filters exist that are stable to within a picometer. Stability to within a picometer for a 405 nm light source corresponds to 2.5 ppm wavelength stability. A fiber Fabry-Perot tunable filter is available from Micron Optics Inc. of Atlanta, Ga.

Figure 6:
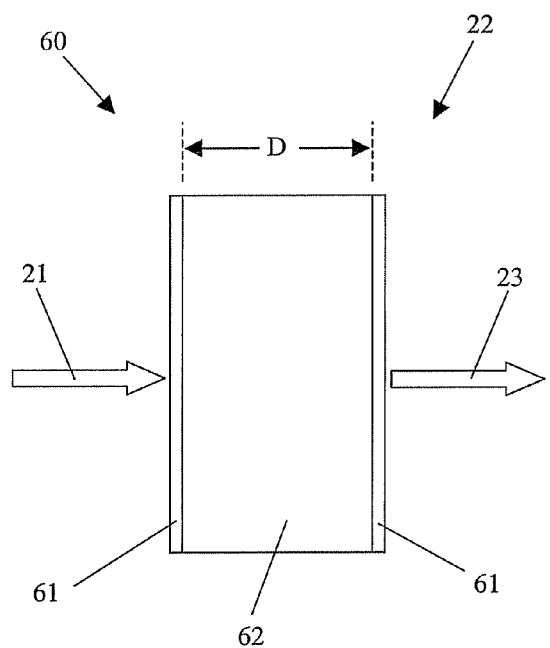
FIG. 6 illustrates an exemplary embodiment of an optical cavity.

FIG. 6 depicts a Fabry-Perot cavity 60. Referring to FIG. 6, the cavity 60 includes mirrored surfaces 61 and a spacer medium 62 in optical contact with the mirrored surfaces 61. The emitted light 21 entering the cavity 60 will reflect multiple times from the mirrored surfaces 61. Only certain wavelengths of the emitted light 21 will be sustained by the cavity 60. The other wavelengths of the emitted light 21 will be suppressed by destructive interference. The result is that the filtered light 23 depicted in FIG. 6 has a narrower range of wavelengths than the emitted light 21 incident on the cavity 60.

Generally, the wavelengths of the light sustained by the cavity 60 are determined by a distance, D, between the mirrored surfaces 61 as shown in FIG. 5. In some embodiments, the cavity 60 can be built using solid state technology such as that used to fabricate semiconductor devices. Fabricating the Fabry-Perot cavity 60 using solid state technology provides a cavity in which light is reflected many times before dissipating. Thus, a solid state Fabry-Perot cavity 60 is efficient in providing light with a narrow bandwidth.

In order to provide the filtered light 23 with little or no variations in the narrow range of wavelengths throughout a range of temperatures, the fiber Bragg grating 50 and the Fabry-Perot cavity 60 may be built using glass having a low coefficient of thermal expansion to achieve 0.01 ppm stability in wavelength. The glass may be referred to as "low expansion glass." In one embodiment of the fiber Bragg grating 50, the core 52 is made from low expansion glass. In one embodiment of the Fabry-Perot cavity 60, the spacer medium 62 is made from low expansion glass. The coefficient of thermal expansion for the low expansion glass used in embodiments of the optical filter 22 can be less than 0.2 ppm/° K over a range of temperatures in the borehole 2. One example of low expansion glass is ULE® glass manufactured by Coming Specialty Materials of Corning, N.Y. Another example of low expansion glass is ZERODUR® glass manufactured by Schott AG of Mainz, Germany.

Generally, the well logging tool 10 includes adaptations as may be necessary to provide for operation during drilling or after a drilling process has been completed.

Figure 7:
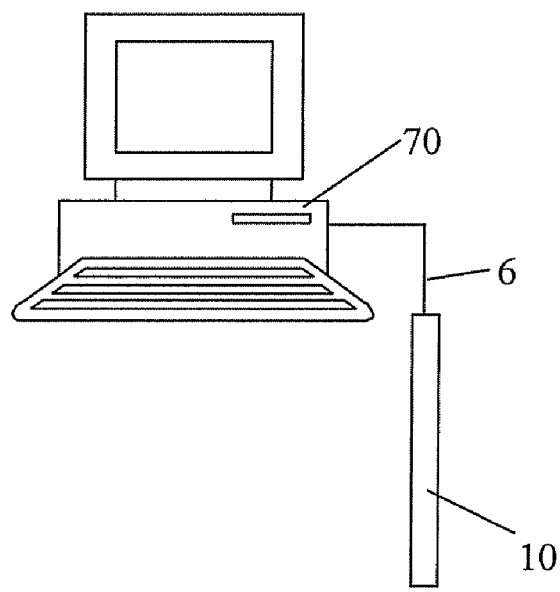
FIG. 7 illustrates an exemplary embodiment of a computer coupled to the logging tool.

Referring to FIG. 7, an apparatus for implementing the teachings herein is depicted. In FIG. 7, the apparatus includes a computer 70 coupled to the well logging tool 10. Typically, the computer 70 includes components as necessary to provide for the real time processing of data from the well logging tool 10. Exemplary components include, without limitation, at least one processor, storage, memory, input devices, output devices and the like. As these components are known to those skilled in the art, these are not depicted in any detail herein.

Generally, some of the teachings herein are reduced to an algorithm that is stored on machine-readable media. The algorithm is implemented by the computer 60 and provides operators with desired output. The output is typically generated on a real-time basis.

The logging tool 10 may be used to provide real-time measurements of various parameters such as gravity for example. As used herein, generation of data in "real-time" is taken to mean generation of data at a rate that is useful or adequate for making decisions during or concurrent with processes such as production, experimentation, verification, and other types of surveys or uses as may be opted for by a user or operator. As a non-limiting example, real-time measurements and calculations may provide users with information necessary to make desired adjustments during the drilling process. In one embodiment, adjustments are enabled on a continuous basis (at the rate of drilling), while in another embodiment, adjustments may require periodic cessation of drilling for assessment of data. Accordingly, it should be recognized that "real-time" is to be taken in context, and does not necessarily indicate the instantaneous determination of data, or make any other suggestions about the temporal frequency of data collection and determination.

A high degree of quality control over the data may be realized during implementation of the teachings herein. For example, quality control may be achieved through known techniques of iterative processing and data comparison. Accordingly, it is contemplated that additional correction factors and other aspects for real-time processing may be used. Advantageously, the user may apply a desired quality control tolerance to the data, and thus draw a balance between rapidity of determination of the data and a degree of quality in the data.

Figure 8:
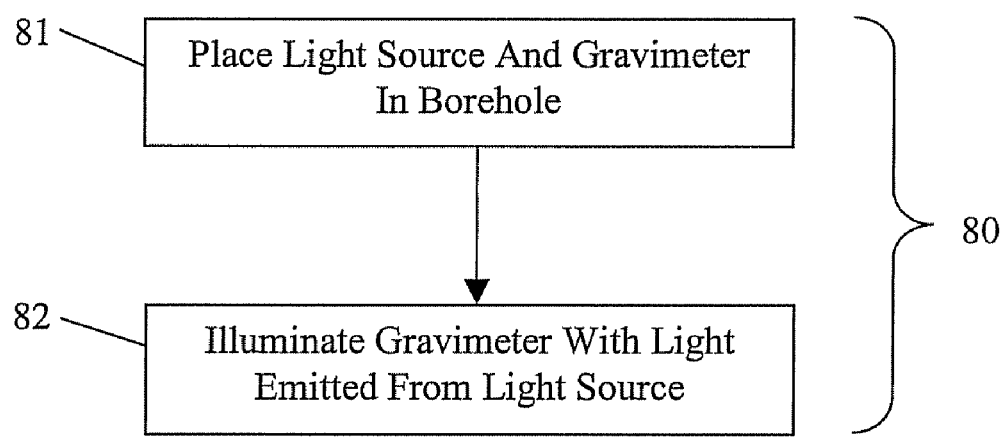
FIG. 8 presents one example of a method for measuring gravitational acceleration from within the borehole.

FIG. 8 presents one example of a method 80 for measuring gravitational acceleration from within the borehole 2. The method 80 calls for placing (step 81) the light source 20 and the gravimeter 24 in the borehole 2. Further, the method 80 calls for illuminating (step 82) the gravimeter 24 with light emitted from the light source 20 wherein the light is used to perform the measuring.

In certain embodiments, a string of two or more logging tools 10 may be used where each logging tool 10 includes at least one light source 20, the optical filter 22 and the light detector 26. In these embodiments, a response from each logging tool 10 may be used separately or combined with other responses to form a composite response.

In support of the teachings herein, various analysis components may be used, including digital and/or analog systems. The digital and/or analog systems may be used in the electronic unit 9. In one embodiment, the electronic unit 9 may be a data collector (data collector 9) for providing measurement data to a user. The electronic unit 9 may be disposed at least one of in the logging tool 10 and at the surface of the earth 7. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), cooling unit, heating unit, sensor, transmitter, receiver, transceiver, antenna, controller, lens, optical unit, electrical unit or electromechanical unit may be included in support of the various aspects discussed herein or in support of other functions beyond this disclosure.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An instrument for measuring gravitational acceleration from within a borehole, the instrument comprising:
 a light source comprising a semiconductor that comprises a bandgap greater than about two electron volts (eV);
 a gravimeter for receiving light from the light source and providing output light with a characteristic related to the gravitational acceleration, the gravimeter implemented by at least one of a nano electro-mechanical system (NEMS) and a micro electro-mechanical system (MEMS) fabricated from a substrate;

wherein the light source and the gravimeter are disposed in a housing adapted for insertion into the borehole; and an optical filter for filtering the light from the light source.

2. The instrument as in claim 1, wherein the optical filter comprises at least one of a fiber Bragg grating and a Fabry-Perot cavity.

3. The instrument as in claim 1, wherein the optical filter comprises a low-expansion glass.

4. The instrument as in claim 3, wherein the low-expansion glass comprises a coefficient of thermal expansion of less than 0.2 ppm/° K.

5. The instrument as in claim 1, further comprising a light detector for measuring the characteristic, the detector comprising a semiconductor that comprises a bandgap greater than about two eV.

6. The instrument as in claim 5, wherein the light detector comprises a photodiode.

7. An instrument for measuring gravitational acceleration from within a borehole, the instrument comprising:

a light source comprising a semiconductor that comprises a bandgap greater than about two electron volts (eV);

a gravimeter for receiving light from the light source and providing output light with a characteristic related to the gravitational acceleration, the gravimeter implemented by at least one of a nano electro-mechanical system (NEMS) and a micro electro-mechanical system (MEMS) fabricated from a substrate;

wherein the light source and the gravimeter are disposed in a housing adapted for insertion into the borehole; and wherein the gravimeter comprises a proof mass coupled to a diffraction grid wherein the diffraction grid is used for measuring displacement of the proof mass.

8. The instrument as in claim 7, further comprising at least one spring coupled to the proof mass and to a support substrate, the spring providing a counterforce to a force of gravity acting on the proof mass.

9. The apparatus as in claim 7, wherein the diffraction grid is formed from a first set of diffraction elements coupled to the proof mass and a second set of diffraction elements coupled to a support substrate, the first set of diffraction elements being interlaced with the second set of diffraction elements.

10. The instrument as in claim 7, further comprising a light detector for measuring the characteristic, the detector comprising a semiconductor that comprises a bandgap greater than about two eV.

11. The instrument as in claim 10, wherein the light detector comprises a photodiode.

12. A method for measuring gravitational acceleration from within a borehole, the method comprising:

disposing a logging tool comprising a light source and a gravimeter in the borehole, the light source comprising a semiconductor that comprises a bandgap greater than about two electron volts (eV), the gravimeter implemented by at least one of a nano electro-mechanical system (NEMS) and a micro electro-mechanical system (MEMS) fabricated from a substrate;

illuminating the gravimeter with light emitted from the light source wherein the light is used to perform the measuring; and filtering the light.

13. The method of claim 12, further comprising detecting light diffracted by the gravimeter with a light source comprising a bandgap greater than about two electron volts (eV).

14. The method of claim 13, wherein detecting comprises measuring an intensity of the diffracted light, the intensity being related to the gravitational acceleration.

15. A system for measuring gravitational acceleration from within a borehole, the system comprising:

a logging tool;

a light source comprising a semiconductor that comprises a bandgap greater than about two electron volts (eV);

a gravimeter for diffracting light emitted from the light source, the diffracted light comprising an intensity related to the gravitational acceleration, the gravimeter being implemented by at least one of a nano electro-mechanical system (NEMS) and a micro electro-mechanical system (MEMS) fabricated from a substrate;

a light detector comprising a semiconductor that comprises a bandgap greater than about two eV, the light detector for measuring the intensity; and a data collector for providing measurement data to a user;

wherein the light source, the gravimeter, the light detector and the data collector are disposed at the logging tool.

16. The system as in claim 15, further comprising at least one of a fiber Bragg grating and a Fabry-Perot cavity for filtering light emitted from the light source.

17. The system as in claim 15, wherein the gravimeter comprises a proof mass and the intensity is related to an amount of displacement of a proof mass.

18. The system as in claim 15, further comprising a computer program product stored on machine-readable media, the product comprising machine-executable instructions for:

operating the light source and the gravimeter in the borehole;

illuminating the gravimeter with light emitted from the light source; and detecting the intensity with the light detector.

* * * * *